United States Patent
Ishizaki (10) Patent No.: US 8,159,981 B2
(45) Date of Patent: Apr. 17, 2012

(54) DETERMINING TRANSPORT BLOCK SIZE USING CHANNEL QUALITY INDICATOR VALUE AND BLOCK ERROR RATE

(75) Inventor: Ryuichiro Ishizaki, Tokyo (JP)

(73) Assignee: NEC Corporation, Tokyo (JP)

( * ) Notice: Subject to any disclaimer, the term of this patent is extended or adjusted under 35 U.S.C. 154(b) by 884 days.

(21) Appl. No.: 12/168,225

(22) Filed: Jul. 7, 2008

(65) Prior Publication Data

US 2009/0010208 A1    Jan. 8, 2009

(30) Foreign Application Priority Data

Jul. 5, 2007   (JP) .................................. 2007-176958

(51) Int. Cl.
*H04B 7/00*    (2006.01)
(52) U.S. Cl. ........................................ 370/310
(58) Field of Classification Search ......................... None
See application file for complete search history.

(56) References Cited

U.S. PATENT DOCUMENTS

| | | | |
|---|---|---|---|
| 6,262,994 B1 * | 7/2001 | Dirschedl et al. ............. 370/465 |
| 7,444,169 B2 * | 10/2008 | Ishii et al. ..................... 455/561 |
| 2004/0157555 A1 * | 8/2004 | Richenstein et al. ........... 455/39 |
| 2005/0053038 A1 * | 3/2005 | Kimura .......................... 370/333 |
| 2005/0220047 A1 * | 10/2005 | Baey et al. ..................... 370/315 |
| 2009/0067376 A1 * | 3/2009 | Ishii et al. ...................... 370/329 |

OTHER PUBLICATIONS

"3rd Generation Partnership Project; Technical Specification Group Radio Access Network; Physical Layer Procedures (FDD)", Release 5, 3GPP TS25.214 V5.11.0, Jun. 2005, pp. 1-51.
"3rd Generation Partnership Project; Technical Specification Group Radio Access Network;High Speed Downlink Packet Access (HSDPA); Overall Description; Stage 2", Release 7, 3GPP Ts 25.308 V7.2.0, Mar. 2007, pp. 1-47.
"3rd Generation Partnership Project; Technical Specification Group Radio Access Network; Medium Access Control (MAC) Protocol Specification", Release 7, 3GPP TS 25.321 V7.4.0, Mar. 2007, pp. 1-126.
"3rd Generation Partnership Project; Technical Specification Group Radio Access Network; High Speed Downlink Packet Access: Physical Layer Aspects", Release 5, 3GPP TR 25.858 V1.0.0, Dec. 2001.

* cited by examiner

*Primary Examiner* — Chi Pham
*Assistant Examiner* — Fan Ng (57) ABSTRACT

In a TBS (Transport Block Size) determination apparatus, a CQI (Channel Quality Indicator) value setting section sets a CQI value which is transmitted from a UE (User Equipment) which communicates based on a packet transmission standard HSDPA (High Speed Downlink Packet Access). A TBS acquiring section acquires a TBS by referring to a CQI mapping table based on the set CQI value. A BLER (BLock Error Rate) setting section sets a BLER before, simultaneously, or after the setting a CQI value, and before, simultaneously, or after the acquiring a TBS. A TBS changing section changes the TBS based on the BLER.

5 Claims, 10 Drawing Sheets

| CQI | TBS | CODE COUNT | MODULATION TYPE |
|---|---|---|---|
| 0 | N/A | Out of range | |
| 1 | 137 | 1 | QPSK |
| 2 | 173 | 1 | QPSK |
| ... | ... | ... | ... |
| 24 | 11418 | 8 | 16-QAM |
| 25 | 14411 | 10 | 16-QAM |
| 26 | 17237 | 12 | 16-QAM |
| 27 | 21754 | 15 | 16-QAM |
| 28 | 23370 | 15 | 16-QAM |
| 29 | 24222 | 15 | 16-QAM |
| 30 | 25558 | 15 | 16-QAM |

DETERMINING TRANSPORT BLOCK SIZE USING CHANNEL QUALITY INDICATOR VALUE AND BLOCK ERROR RATE

INCORPORATION BY REFERENCE

This patent application claims priority on convention based on Japanese Patent application NO. 2007-176958 filed on Jul. 5, 2007. The disclosure thereof is incorporated herein by reference.

TECHNICAL FIELD

The present invention relates to an apparatus and method for determining TBS (Transport Block Size).

BACKGROUND ART

HSDPA (High Speed Downlink Packet Access) is one of high-speed packet transmission techniques developed by a standardization organization called 3GPP (Third Generation Partnership Project). It is standardized in "Release 5" of 3GPP and thereafter. HSDPA employs an adaptive modulating system. The adaptive modulating system comprehensively determines states of fluctuating radio wave propagation paths, i.e. determines changes in transmission of radio wave in the air, and automatically selects the best modulation method. Specifically, when the transmission path is in a noisy state, a modulation method is automatically switched to QPSK (Quadrature Phase Shift Keying) that is highly stable but a low speed operation. When the transmission path is in a good state, the modulation method is automatically switched to 16QAM (16 Quadrature Amplitude Modulation) that provides a higher speed operation.

Figure 1:
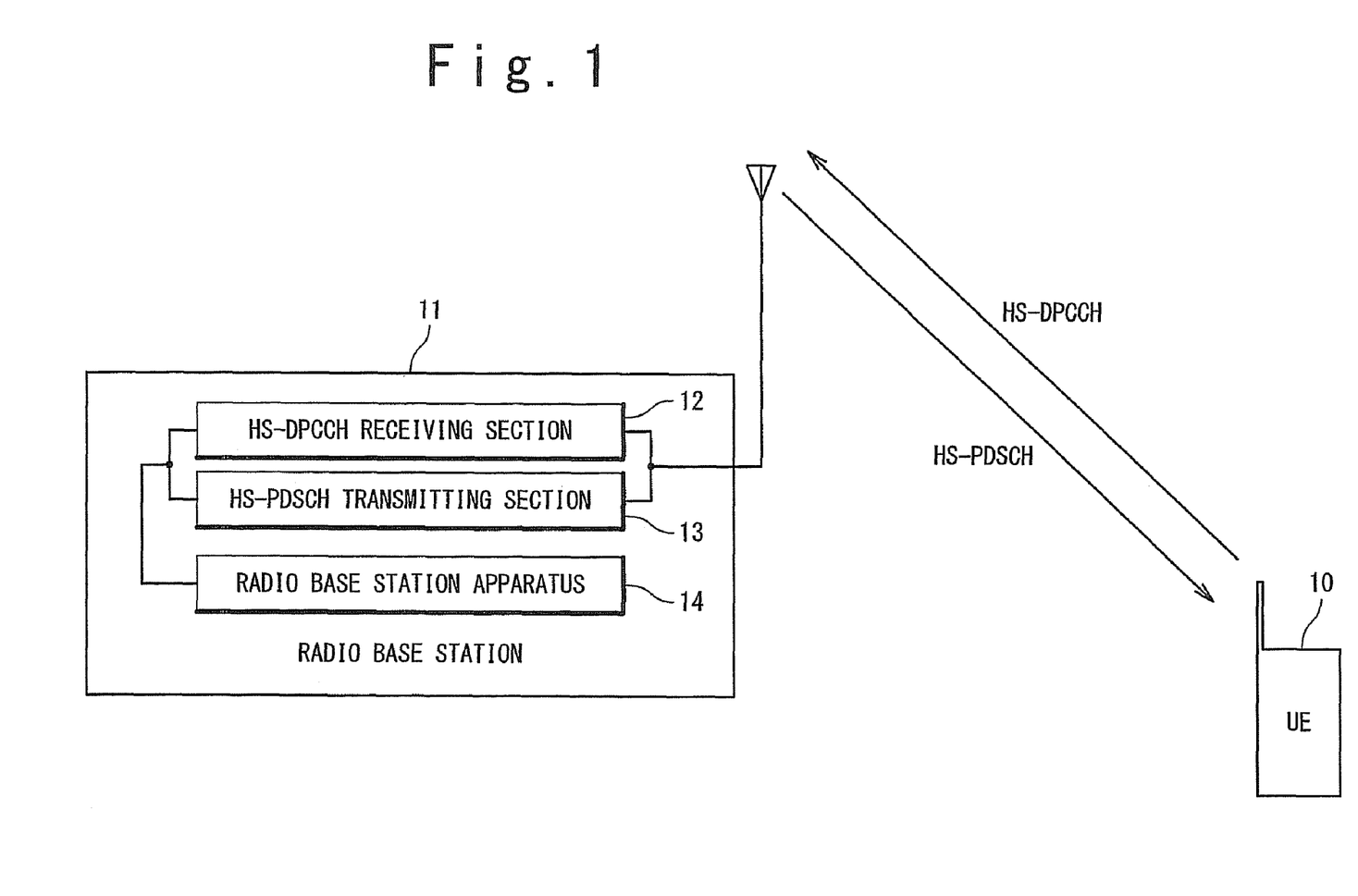
FIG. 1 is a diagram showing a communication system operating based on HSDPA.

FIG. 1 shows an HSDPA-based communication system. In FIG. 1, a UE (user equipment) 10 transmits a CQI (Channel Quality Indicator) value to a radio base station 11 by using an uplink dedicated control channel HS-DPCCH (High Speed-Dedicated Physical Control Channel) to indicate a radio wave reception state. The radio base station 11 contains an HS-DPCCH receiving section 12, an HS-PDSCH (High Speed-Physical Downlink Shared Channel) transmitting section 13, and a radio base station unit 14. The radio base station unit 14 determines a modulation method, an encoding method, and the like based on the CQI value transmitted from the UE 10. In accordance with the modulation method, the encoding method, and the like, the radio base station 11 transmits packets to the UE 10 by using a downlink shared channel HS-PDSCH. The UE 10 receives the packets sent to itself through the downlink shared channel HS-PDSCH.

In FIG. 1, the radio base station 11 performs scheduling of destination UE for every TTI (Transmission Time Interval), and transmits the packets by using the downlink shared control channel HS-PDSCH. When receiving the packets sent to itself through the downlink shared control channel HS-PDSCH, the UE 10 decodes the packets based on HARQ (Hybrid Automatic Repeat Request). If the packet is decoded properly, the UE 10 transmits an ACK (ACKnowledgement) signal by using the uplink dedicated control channel HS-DPCCH. If decoding of the packet is unsuccessful, the UE 10 transmits a NACK (Negative ACKnowledgement) signal by using the uplink dedicated control channel HS-DPCCH. The radio base station 11 performs a packet retransmission control based on the ACK signal or the NACK signal received from the UE 10. The UE 10 may not be able to return the ACK signal nor the NACK signal, depending on the state of the radio wave. The radio base station 11 takes such a state into account to perform the packet retransmission control.

Figure 2:
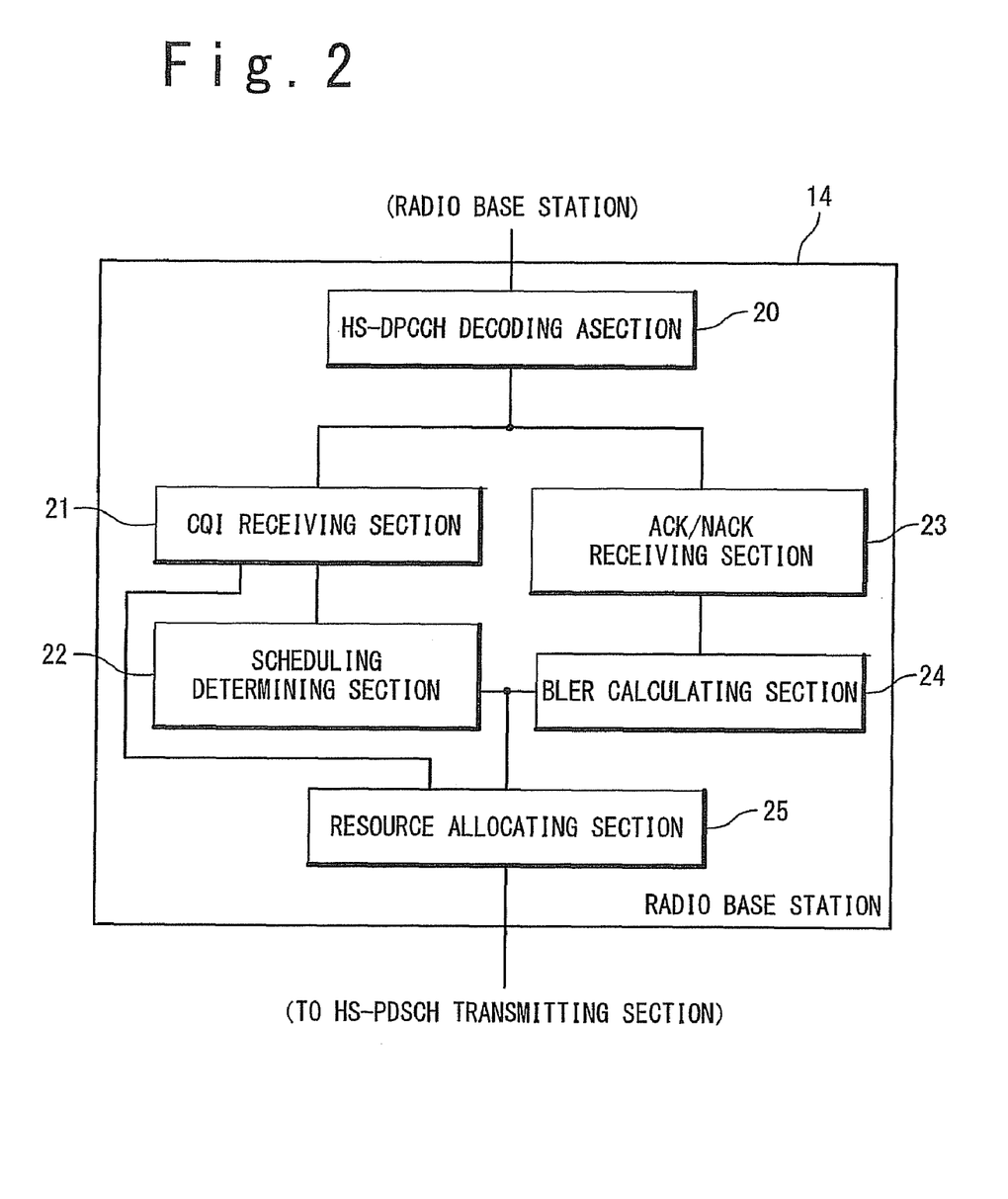
FIG. 2 is a block diagram showing a configuration of a radio base station apparatus.

FIG. 2 shows a block configuration of the radio base station unit 14. In FIG. 2, the radio base station 11 contains an HS-DPCCH decoding section 20, a CQI receiving section 21, a scheduling determining section 22, an ACK/NACK receiving section 23, a BLER (Block Error Rate) calculating section 24, and a resource allocating section 25. The HS-DPCCH decoding section 20 decodes a reception signal received from a HS-DPCCH receiving section 12. The CQI receiving section 21 receives the CQI value as a result of decoding. The ACK/NACK receiving section 23 receives the ACK signal or NACK signal obtained through the decoding. The scheduling determining section 22 refers to the CQI value received by the CQI receiving section 21, and determines in units of TTI, a single UE or a plurality of UEs for transmitting packets according to a predetermined scheduling algorithm. The BLER calculating section 24 calculates a BLER based on a reception result of the ACK signal or the NACK signal received by the ACK/NACK receiving section 23. When the ACK/NACK receiving section 23 has received the ACK signal or the NACK signal, the BLER calculating section 24 can calculate the BLER from the ACK signal and the NACK signal. However, when the ACK/NACK receiving section 23 has not been able to receive the ACK signal nor the NACK signal because of the state of the radio wave, the BLER calculating section 24 can calculate the BLER by using data other than the ACK signal and the NACK signal. The resource allocating section 25 allots communication resources by determining TBS (Transport Block Size) based on the CQI value, determining the number of codes (the number of HS-PDSCHs (High Speed-Physical Downlink Shared Channel), and determining the modulation method, etc.

Figure 3:
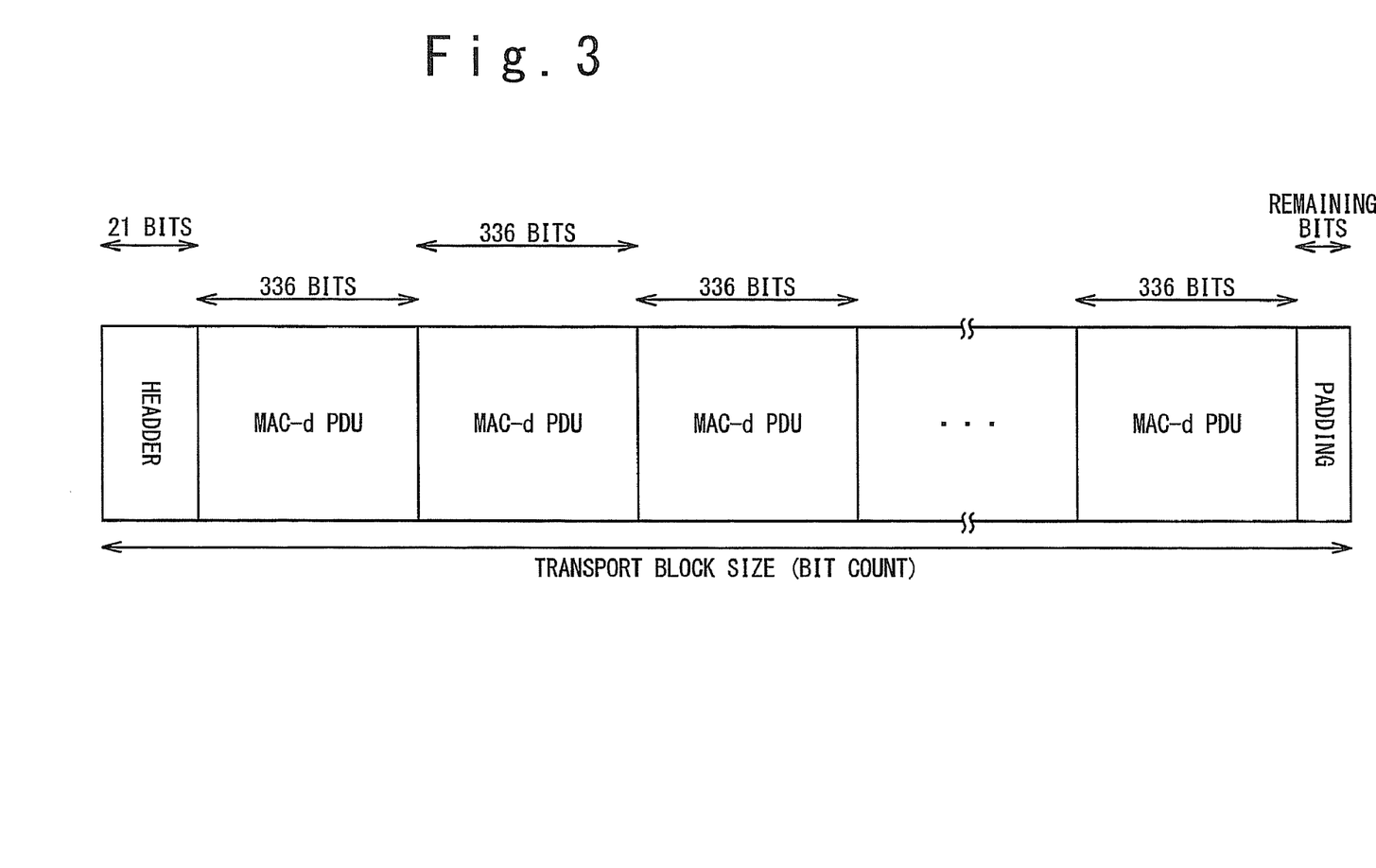
FIG. 3 is a diagram showing a packet that is transmitted from a radio base station.

FIG. 3 is a diagram showing a packet transmitted from the radio base station. FIG. 3 shows a single packet as an example. The entire length of the packet is expressed with TBS in a unit of bits. The packet shown in FIG. 3 has a 21-bit header. The header contains information such as a queue ID, and the length or number of MAC-d PDUs (Medium Access Control-dedicated Protocol Data Unit). The MAC-d PDUs are inserted in the packet. The size of MAC-d PDU is decided to be 336 bits or 656 bits on the standard. Here, 336-bit MAC-d PDUs are illustrated as an example. The remaining section of the packet following the header and the MAC-d PDUs is a padding section.

Figure 4:
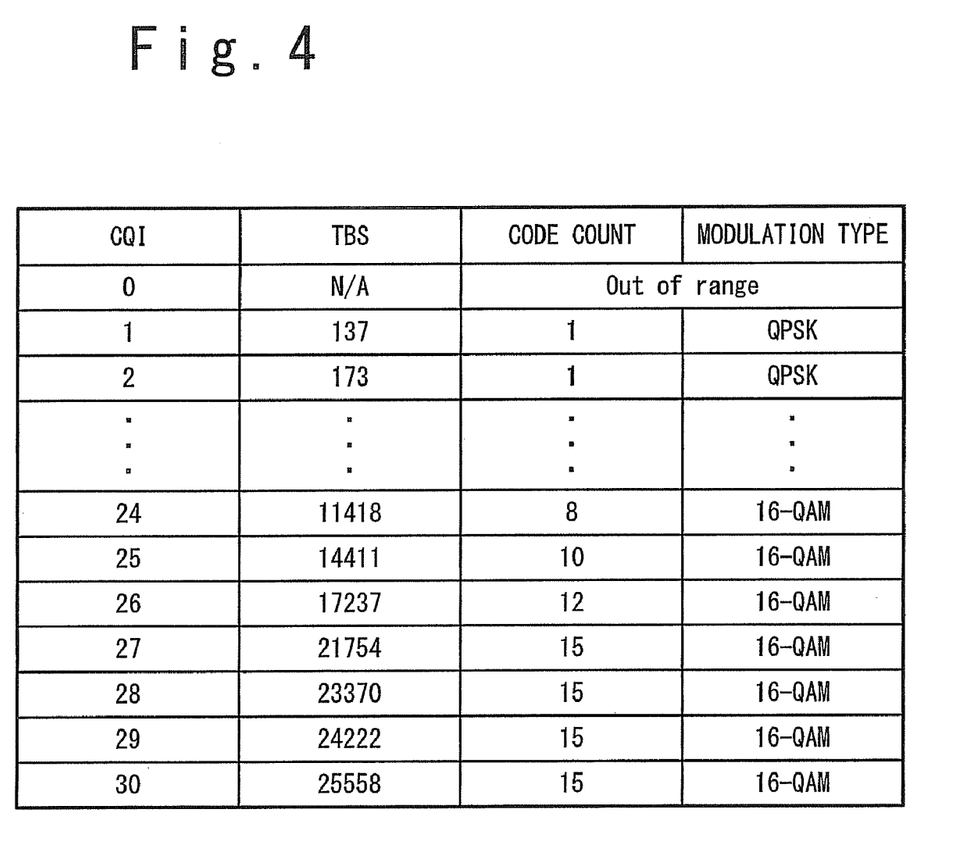
FIG. 4 is a diagram showing a CQI mapping table.

FIG. 4 shows a CQI mapping table. In the HSDPA, UEs are classified into a plurality of categories, and a CQI mapping table is prepared for each category. The CQI mapping table shown in FIG. 4 is applied to the UE of category "10". In FIG. 4, numerical values in a "CQI" column indicate the CQI values that are transmitted from the UE by using the uplink dedicated control channel HS-DPCCH. There are thirty values from "1" to "30". Numerical values in a "TBS" column indicate TBS of the packet to be transmitted to the UE. The TBS can be calculated from the CQI value uniquely. The TBS is not available when the CQI value is "0". Numerical values in a "code count" column indicate the number of downlink shared channels HS-PDSCH, and a "modulation type" column indicates a modulation method at the time of transmitting the packet. The code count and the modulation type are out of ranges when the CQI value is "0".

As shown in FIG. 4, under the standardization of 3GPP, thirty values from "1" to "30" are defined as the CQI values. Therefore, there are at most thirty kinds of TBSs corresponding to the CQI values for each category of the UE. In this example, the numbers of MAC-d PDUs contained in TBS does not necessarily become continuous. This tendency is especially prominent when the CQI values are high in the UE of category "10". For example, referring to the CQI values of "24"-"30" in FIG. 4, the TBSs in those sections are "11418 (CQI=24)", "14411 (CQI=25)", "17237 (CQI=26)", "21754 (CQI=27)", "23370 (CQI=28)", "24222 (CQI=29)", and "25558 (CQI=30)", respectively. The numbers of MAC-d PDUs are "33 (CQI=24)", "42 (CQI=25)", "51 (CQI=26)", "64 (CQI=27)", "69 (CQI=28)", "72 (CQI 29)", and "76 (CQI=30)", provided that the size thereof is in units of 336 bits as shown in 3GPP TS25. 214, 3GPP TS25. 308, 3GPP TS25. 321 and 3GPP TS25. 858.

SUMMARY

It is therefore an object of the present invention to change the numbers of MAC-d PDUs contained in TBS in a sequential manner.

In an exemplary embodiment of the present invention, a TBS (Transport Block Size) determination apparatus includes CQI (Channel Quality Indicator) value setting means for setting a CQI value which is transmitted from a UE (User Equipment) which communicates based on a packet transmission standard HSDPA (High Speed Downlink Packet Access); TBS acquiring means for acquiring a TBS by referring to a CQI mapping table based on the set CQI value; BLER (BLock Error Rate) setting means for setting a BLER before, simultaneously, or after the setting a CQI value, and before, simultaneously, or after the acquiring a TBS; and TBS changing means for changing the TBS based on the BLER.

In another exemplary embodiment of the present invention, a method of determining a TBS (Transport Block Size), includes: setting a CQI (Channel Quality Indicator) value which is transmitted from a UE (User Equipment) which communicates based on a packet transmission standard HSDPA (High Speed Downlink Packet Access); acquiring a TBS by referring to a CQI mapping table based on the set CQI value; setting a BLER (BLock Error Rate) before, simultaneously, or after the setting a CQI value, and before, simultaneously, or after the acquiring a TBS; and changing the TBS based on the BLER.

In still another exemplary embodiment of the present invention, a recording medium in which a computer-readable software program code is stored to realize the above TBS determining method.

With the present invention, it is possible to provide a variation in TBS that is standardized to be thirty kinds at most based on the CQI mapping table of HSDPA. Further, it is also possible to change the numbers of MAC-d PDUS contained in TBS in a sequential manner.

BRIEF DESCRIPTION OF DRAWINGS

The above and other objects, advantages and features of the present invention will be more apparent from the following description of certain embodiments taken in conjunction with the accompanying drawings, in which.

EXEMPLARY EMBODIMENTS

Hereinafter, a TBS determining apparatus according to exemplary embodiments of the present invention will be described in detail with reference to the attached drawings.
[First Exemplary Embodiment]

Figure 5:
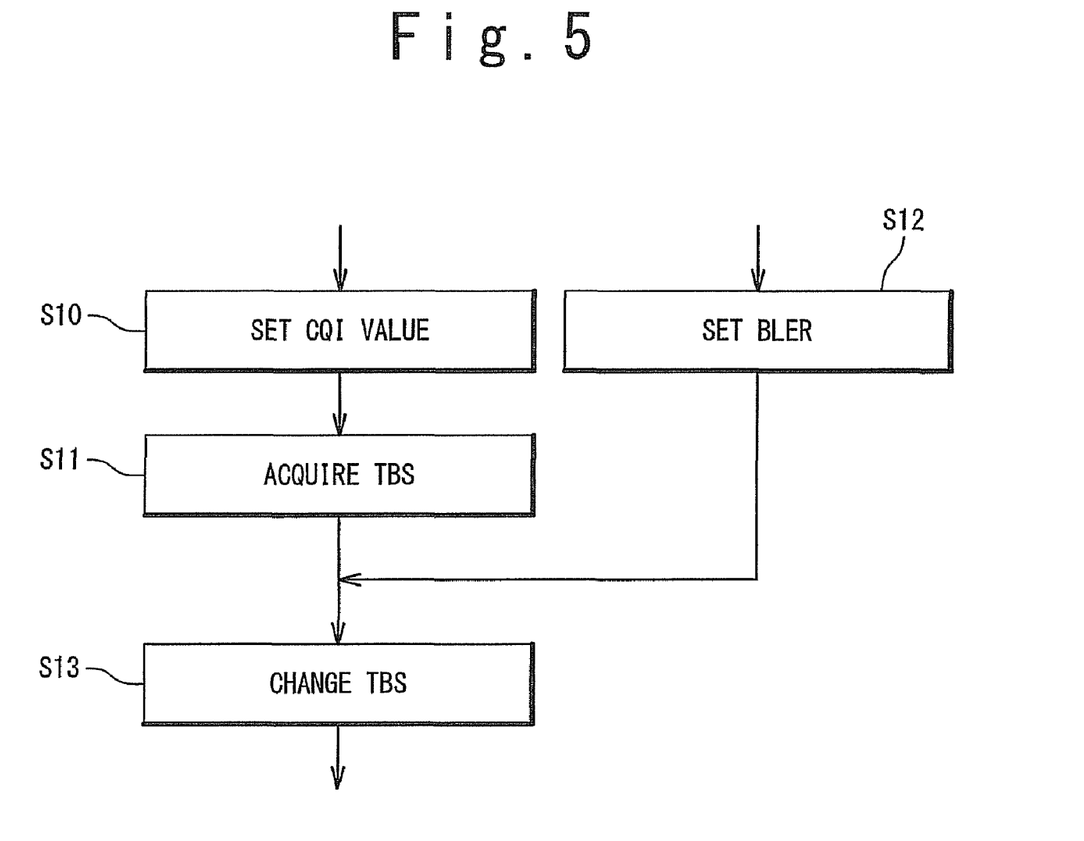
FIG. 5 is a diagram showing a TBS determining method according to a first exemplary embodiment of according to the present invention.

The TBS determining apparatus according to a first exemplary embodiment has the same configuration as shown in FIG. 2. FIG. 5 shows a TBS determining method performed by the TBS determining apparatus according to the first exemplary embodiment of the present invention. This TBS determining method can be used in the resource allocating section 25 shown in FIG. 2. In FIG. 5, a CQI value is set which is transmitted from a UE that carries out communications based on the packet communication standard HSDPA (S10). A TBS corresponding to the CQI value is acquired by referring to a CQI mapping table (S11). A BLER is set (S12) before, simultaneously, or after setting the CQI value (S10) and before, simultaneously, or after acquiring the TBS (S11). Based on the set BLER, the acquired TBS is changed (S13).
[Second Exemplary Embodiment]

Figure 6:
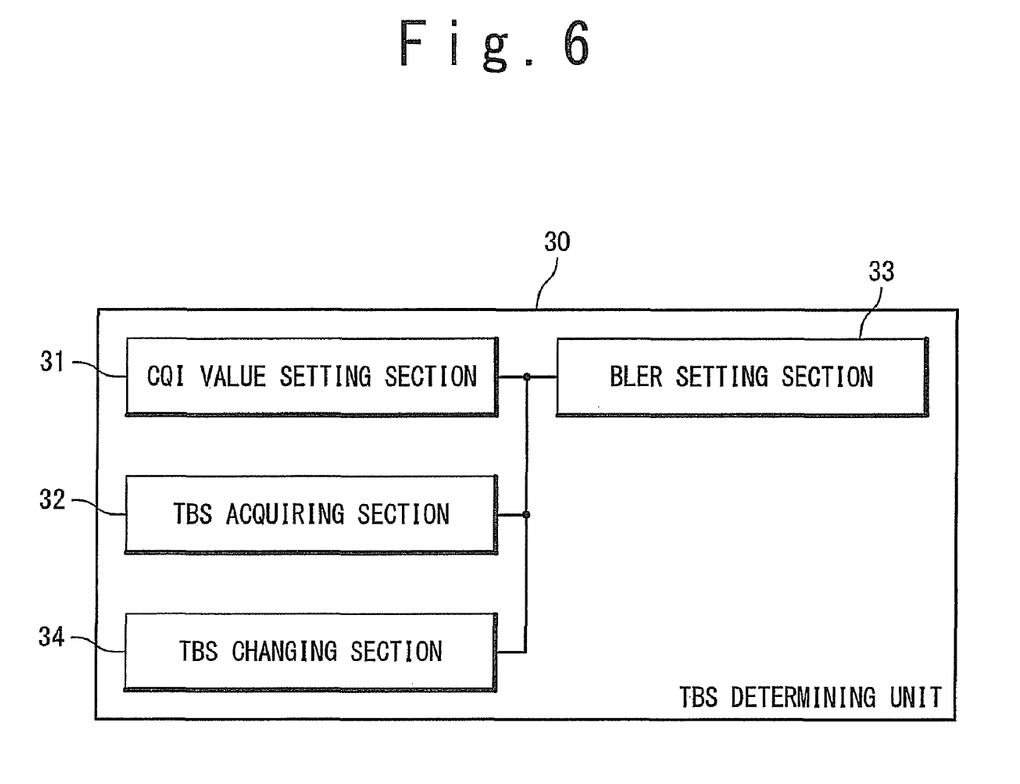
FIG. 6 is a diagram showing a TBS determination apparatus according to a second exemplary embodiment of the present invention.

FIG. 6 shows a TBS determination apparatus according to a second exemplary embodiment of the present invention. The TBS determination apparatus can be incorporated into the resource allocating section 25. In FIG. 6, the TBS determination apparatus 30 includes a CQI-value setting section 31, a TBS acquiring section 32, a BLER setting section 33, and a TBS changing section 34. The CQI-value setting section 31 sets a CQI value transmitted from the UE that carries out communications based on the packet communication standard HSDPA. The TBS acquiring section 32 refers to the CQI mapping table, to acquire the TBS corresponding to the CQI value. The BLER setting section 33 sets the BLER. The TBS changing section 34 changes the acquired TBS based on the set BLER.
[Third Exemplary Embodiment]

In a third exemplary embodiment of the present invention, thirty kinds at most of TBS defined in a CQI mapping table are changed by considering the BLER. The TBS is changed through increasing or decreasing the number of MAC-d PDUs contained in the TBS (MAC-d PDU count) while considering the BLER. However, if the TBS is changed when the MAC-d PDU count is not continuous, the MAC-d PDU count largely changes. When the MAC-d PDU count is largely decreased and the transmission is carried out in a small TBS, there is a possibility that a throughput is unnecessarily reduced. In the meantime, when the MAC-d PDU count is largely increased and the transmission is carried out in a large TBS, there is a possibility that a BLER rises. Therefore, in the third exemplary embodiment, an offset value is provided for the MAC-d PDU count so as to perform optimization of the TBS for all BLERs including a high BLER and a low BLER, in order to overcome problems such as unnecessary deterioration in the throughput and an increase in the BLER. Further, an upper limit for the change in the MAC-d PDU count is set such that the changed MAC-d PDU count does not exceed the MAC-d PDU counts corresponding to the previous and following CQI values in the CQI mapping table.

FIGS. 7 to 10 are flowcharts showing algorithm of the TBS determining method according to the present invention. This algorithm is realized as a software program and can be loaded on the resource allocating section 25 of FIG. 2. The resource allocating section 25 receives the CQI value from the CQI value receiving section 21 and the calculated BLER from the BLER calculating section 24, and sets these values in a memory.

Figure 7:
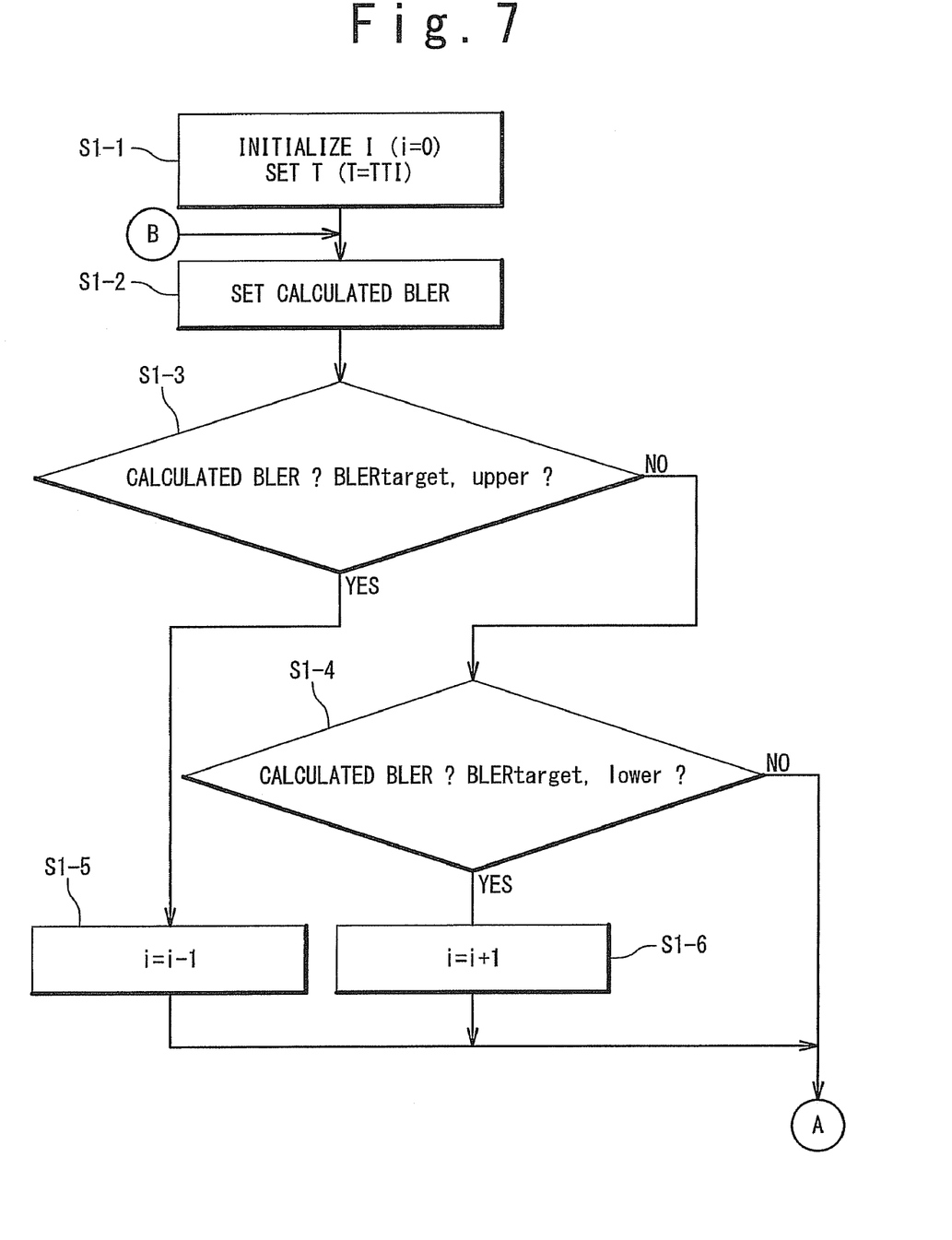
FIGS. 7 and 8 are a flowchart showing an algorithm of the TBS determining method.

In FIG. 7, variables "i", "T", "calculated BLER", "BLER target, upper", and "BLER target, lower" are used. Meanings of these variables are as follows. Here, variable "i" is a coefficient used to change the MAC-d PDU count, "T" is an interval time for measuring and calculating the BLER, "Calculated BLER" is a BLER calculated by the BLER calculating section 24 shown in FIG. 2, "BLER target, upper" is a target BLER as a reference when decreasing the MAC-d PDU count, and "BLER target, lower" is a target BLER as a reference when increasing the MAC-d PDU count.

Figure 8:
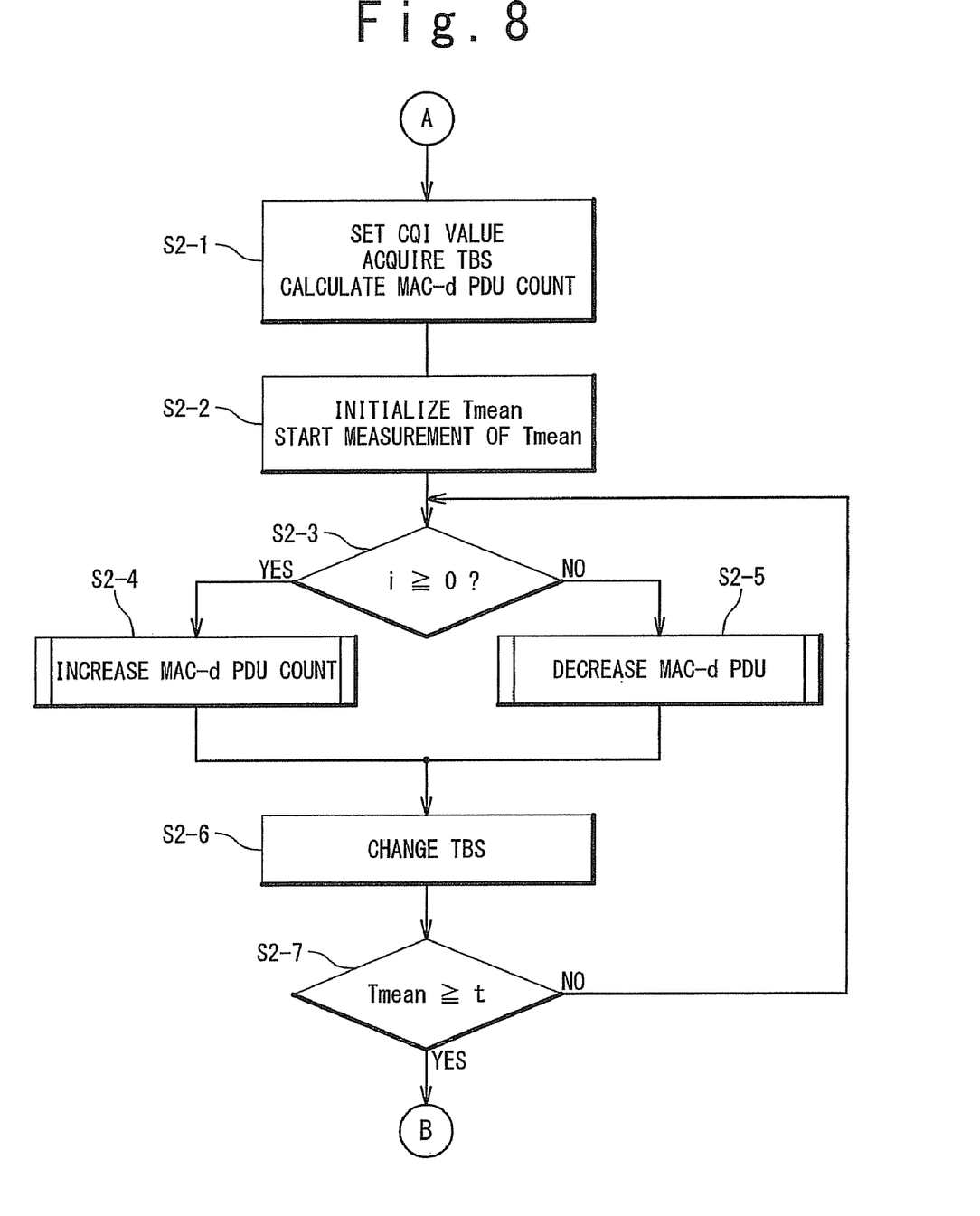

In FIG. 8, variables "CQI value", "TBS", "MAC-d PDU number", and "Tmeas" are used. Here, "CQI value" is a CQI value received by the CQI receiving section 21 shown in FIG. 2, "TBS" is a TBS that is to be changed, "MAC-d PDU number" is a count that can be increased/decreased, and "Tmeas" is a timer value for measuring the BLER for "T".

Figure 9:
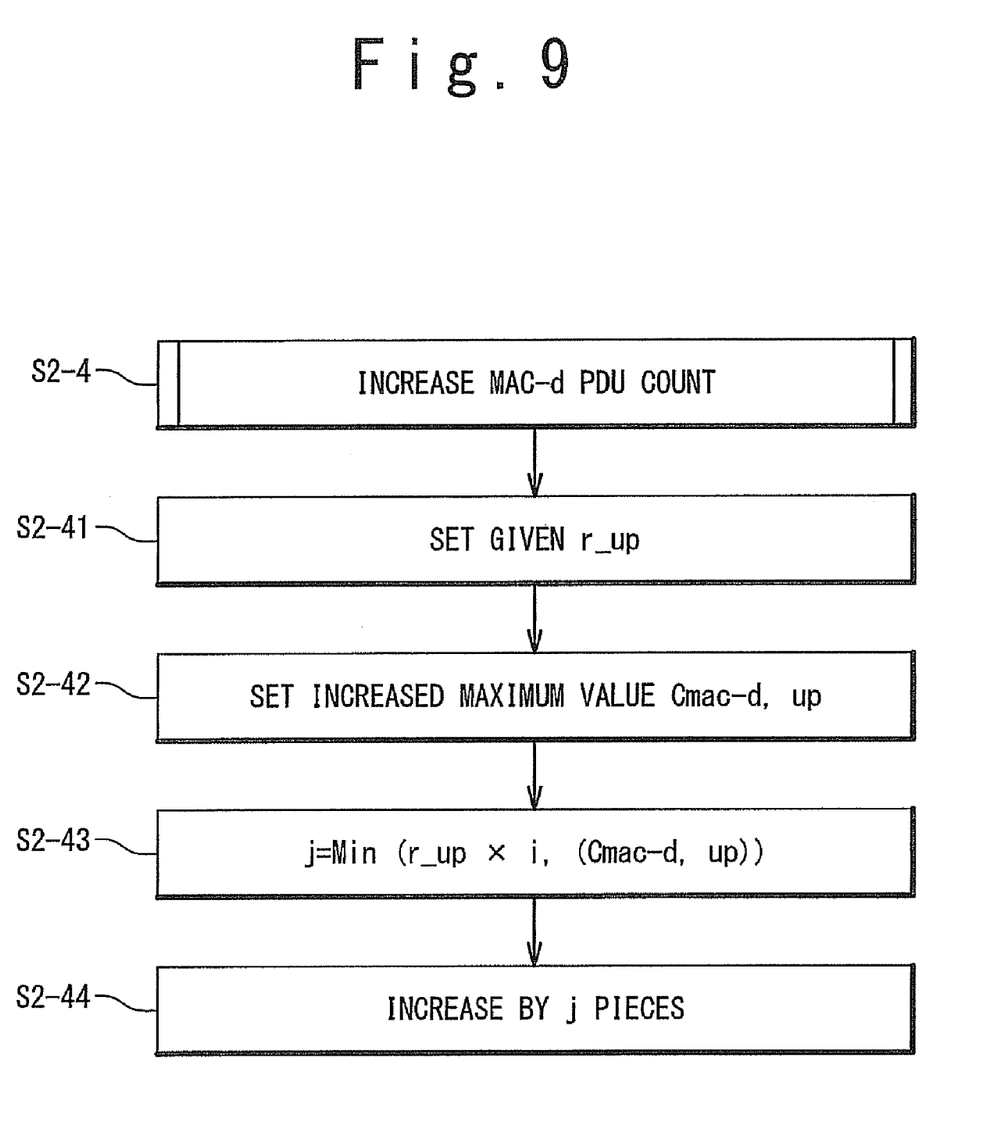
FIG. 9 is a flowchart showing a process executed for increasing a MAC-d PDU count.
Figure 10:
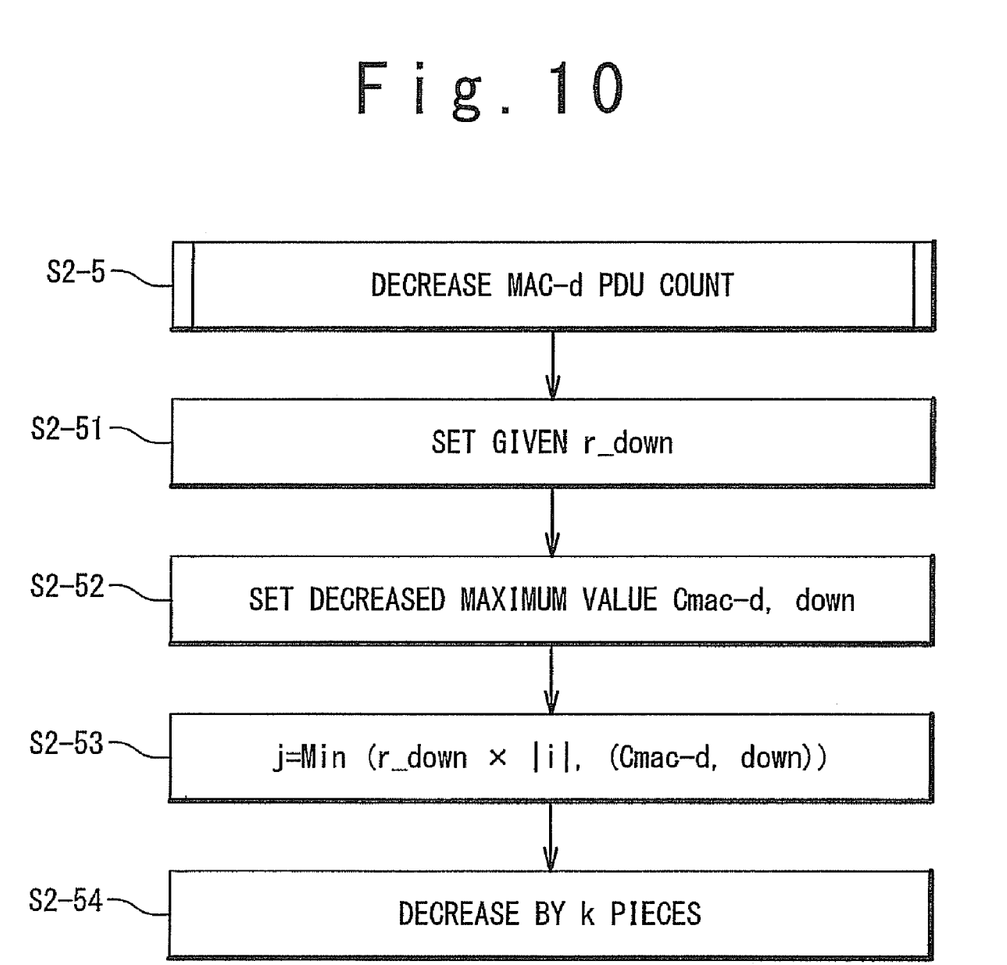
FIG. 10 is a flowchart showing a process executed for decreasing the MAC-d PDU count.

In FIG. 9, variables "r_up", "Cmac-d, up", and "j", are used. In FIG. 10, variables "r_down", "Cmac-d, down", and "k", are used. Here, "j" is an increment amount in "MAC-d PDU count", "k" is a decrement amount in "MAC-d PDU count", "r_up" is a change amount when increasing "MAC-d PDU count", "r_down" is a change amount when decreasing "MAC-d PDU number", "Cmac-d, up" is an absolute value of a difference between a MAC-d PDU count corresponding to the received CQI value and a MAC-d PDU count corresponding to a higher CQI value that is increased by an amount of Cmax, "Cmac-d, down" is an absolute value of a difference between a MAC-d PDU count corresponding to the received CQI value and a MAC-d PDU count corresponding to a lower CQI value that is decreased by amount of Cmax, and "Cmax" is a maximum value in the change amount of the CQI value.

The flowcharts shown in FIGS. 7 to 10 will be described in detail. In FIG. 7, first, appropriate values are substituted into "T", "BLER target, upper", and "BLER target, lower". The third exemplary embodiment will be described by employing the following values: T=100 ms, BLER target, upper=20%, and BLER target, lower=5%

Since "T=100 ms" is set, the control flow returns once again to the flowchart of FIG. 7 when 100 ms has passed after jumping from the flowchart of FIG. 7 to the flowchart of FIG. 8. The flowchart of FIG. 8 is executed for 100 ms. Since "BLER target, upper=20%" is set, "MAC-d PDU count" is decreased when the reception state of radio wave is as bad as to such an extent that the BLER becomes 20% or more. Since "BLER target, lower=5%" is set, "MAC-d PDU number" is increased when the reception state of radio wave is as good as to such an extent that the BLER becomes 5% or less.

In FIGS. 9 and 10, appropriate values are substituted to "r_up" and "r_down". The third exemplary embodiment will be described by employing the following values: r_up=1, and r_down=1.

Further, in FIGS. 9 and 10, values given to "Cmac-d, up" and "Cmac-d, down" depend on the CQI value. In this exemplary embodiment, following values are substituted, provided that the category of the UE is "10", the size of MAC-d PDU is "336 bits", and the received CQI value is "27": Cmac-d, up=5 (=69−64), and Cmac-d, down=13 (=64−51).

In this exemplary embodiment, however, "Cmax=1" is set. As described above, the counts of MAC-d PDUs contained in the respective TBS corresponding to the CQI values of 26, 27, and 28 are "51 (CQI=26)", "64 (CQI=27)", and 69 (CQI= 28)", respectively.

(In Case of Good BLER)

First, a case of good BLER will be described. In FIG. 7, "i" is initialized and "T" is set (S1-1) as follows: i=0, and T=100 ms. The calculated BLER is set (S1-2). In this case, it is assumed that the BLER is calculated as 2% by the BLER calculating section 24: Calculated BLER=2%. The calculated BLER is compared with "BLER target, upper" (S1-3). Since the calculated BLER is 2%, the control flow advances to "NO". Then, the calculated BLER is compared with "BLER target, lower" (S1-4). Since the calculated BLER is 2%, the control flow advances to "YES". At this step, the variable "i" is incremented by one (S1-6). Then, the control flow jumps to FIG. 8. In parallel to the process shown in FIG. 8, the BLER is measured and calculated.

In FIG. 8, the CQI value is set, the TBS is acquired, and the MAC-d PDU number is calculated (S2-1): CQI value=27, TBS=21754, and MAC-d PDU count=64. Initialization and calculation of Tmeas are started (S2-2). Whether or not "i" is negative is determined (S2-3). Since "i=1", the control flow advances to "YES". Subsequently, a step of increasing the MAC-d PDU count is performed (S2-4). Also, the TBS is changed in correspondence to the increase in the MAC-d PDU count (S2-6). Whether or not the timer value has counted 100 ms or more is determined (S2-7). If the time of 100 ms or more is determined to be counted, the control flow returns to FIG. 7 and the next calculated BLER is set (S1-2). If the time of 100 ms or more is not determined to be counted, the control flow returns to determine whether or not "i" is negative again (S2-3).

FIG. 9 is a flowchart showing a process of increasing the MAC-d PDU count. In FIG. 9, the given r_up is set (S2-41): r_up=1. Then, a maximum increase value "Cmac-d, up" is set (S2-42): "Cmac-d, up"=5 (=69−64), wherein "Cmax=1". Subsequently, j=Min (r_up×i, (Cmac-d, up)) is calculated (S2-43). Since 1×1=1, which is smaller than 5, "j=1" is calculated. At last, the MAC-d PDU count is increased by j=1 (S2-44). A total of the MAC-d PDU counts is increased to sixty-five. The TBS comes to have 21861 bits (=21+336×65) in accordance with the increment in the MAC-d PDU count (S2-6).

(In Case of Bad BLER)

Next, a case of bad BLER will be described. In FIG. 7, "i" is initialized and "T" is set (S1-1): i=0, and T=100 ms. The calculated BLER is set (S1-2). In this case, it is assumed that BLER is calculated as 25% by the BLER calculating section 24: Calculated BLER=25%. The calculated BLER is compared with "BLER target, upper" (S1-3). Since the calculated BLER is 25%, the control flow advances to "YES". Thus, the variable "i" is decremented (S1-5). The control flow jumps to FIG. 8. In parallel to the process shown in FIG. 8, the BLER is measured and calculated.

In FIG. 8, the CQI value is set, the TBS is acquired, and the MAC-d PDU number is calculated (S2-1): CQI value=27, TBS=21754, and MAC-d PDU number=64. Initialization and calculation of Tmeas are started (S2-2). Whether or not "i" is negative is determined (S2-3). Since "i=−1", the control flow advances to "NO". Thus, the step of decreasing the MAC-d PDU count is carried out (S2-5). The TBS is changed in correspondence to the decrease in the MAC-d PDU count (S2-6). Then, whether or not the timer value has counted 100 ms or more is determined (S2-7). If it the count is determined to be 100 ms or more, the control flow returns to FIG. 7 and the next calculated BLER is set (S1-2). If the count is determined to be less than 100 ms, the control flow returns to the step S2-3 again to judge whether "i" is negative or not (S2-3).

FIG. 10 is a flowchart showing the process of decreasing the MAC-d PDU count. In FIG. 10, the given r_down is set (S2-51): r_down=1. Then, the maximum decrease value "Cmac-d, down" is set (S2-52): "Cmac-d, down"=13 (=64−51), and "Cmax=1". Subsequently, k=Min (r_down×|i|, (Cmac-d, down)) is calculated (S2-53). Since 1×|−1|=1, which is smaller than 13, "k=1" is calculated. At last, the MAC-d PDU count is decreased by k=1 (S2-54). The total of the MAC-d PDU counts is decreased to sixty-three. The TBS comes to have 21189 bits (=21+336×63) in accordance with the decrease in the MAC-d PDU count (S2-6).

The algorithm for changing the TBS has been described above. When a function of carrying out the above-described TBS changing process is added to the resource allocating section 25 of FIG. 2, the function may be set to be capable of switching on/off. Further, the code count, the modulation methods, and the like before increasing/decreasing the MAC-d PDU count may basically be inherited according to the CQI mapping table. However, the required code count and the modulation method may become different depending on the TBS to be increased/decreased. In such a case, the algorithm may be modified, considering that point.

[Fourth Exemplary Embodiment]

The flowcharts shown in FIGS. 7 to 10 may be achieved by a program that allows a computer to execute each step. The program is stored in a recording medium. A change in the TBS according to the BLER can be performed in accordance with a program which allows a computer to execute: a step of setting a CQI value transmitted from a UE that carries out communications based on the packet communication standard HSDPA; a step of acquiring the TBS corresponding to the CQI value, by referring to the CQI mapping table; a step of setting the BLER to be calculated from the ACK signal and NACK signal transmitted from the UE, before, simultaneously, or after the step of setting the CQI value and before, simultaneously, or after the acquiring step; and a step of changing the acquired TBS based on the calculated BLER.

The changing step may include steps of: calculating the count of MAC-d PDUs contained in the TBS; increasing/decreasing the MAC-d PDU count based on the BLER; and making the TBS large or small in correspondence to the increase/decrease in the MAC-d PDU count. The increasing/decreasing step may include steps of: determining whether or not the BLER is below a predetermined minimum reference value; and increasing the MAC-d PDU count when it is determined to be below the predetermined minimum reference value. Further, the step of making the TBS large/small may include a step of making the TBS large in correspondence to the increase in the MAC-d PDU count at the increasing step.

The increasing step may include steps of: acquiring a higher TBS corresponding to a higher CQI value obtained by increasing the CQI value by one, or by two or more by referring to the CQI mapping table; setting the count of higher MAC-d PDUs contained in the higher TBS as the higher MAC-d PDU count; and increasing the MAC-d PDU count within a range that does not exceed the higher MAC-d PDU count.

The step of increasing the MAC-d PDU counts within a range may include steps of: calculating a difference between the count of MAC-d PDUs contained in the TBS and the higher MAC-d PDU count; repeating the increase in the MAC-d PDU count by one, or by two or more based on the BLER; and setting an increment in the MAC-d PDU count as the difference, when an increment amount in the MAC-d PDU count exceeds the difference at the repeating step.

The increasing/decreasing step may include steps of: determining whether or not the BLER exceeds a predetermined maximum reference value; and decreasing the MAC-d PDU count when it is determined to exceed the predetermined maximum reference value. Further, the step of expanding or reducing the TBS can include a step of decreasing the TBS in correspondence to a decrease in the MAC-d PDU count at the decreasing step. The decreasing step may include steps of: acquiring a lower TBS corresponding to a lower CQI value obtained by decreasing the CQI value by one, or by two or more by referring to the CQI mapping table; setting the count of lower MAC-d PDUs contained in the lower TBS as the lower MAC-d PDU count; and decreasing the MAC-d PDU count within a range that does not fall below the lower MAC-d PDU count.

The step of decreasing the MAC-d PDU count within a range may include steps of: calculating a difference between the count of MAC-d PDUs contained in the TBS and the lower MAC-d PDU count; repeating the decrease in the MAC-d PDU count by one, or by two or more based on the BLER; and setting the decrease in the MAC-d PDU count as a difference, when the decrease in the MAC-d PDU count exceeds the difference at the repeating step.

The step of setting the BLER may be executed by every predetermined time. Further, the step of changing the TBS may be executed between the step of setting a given BLER executed by every predetermined time and a step of setting the next BLER.

[Fifth Exemplary Embodiment]

Further, the computer that executes the above-mentioned program operates as the TBS determination apparatus, and it is considered to contain following functional blocks: a CQI-value setting section which sets the CQI value transmitted from a UE that carries out communications by conforming to the packet communication standard HSDPA, a TBS acquiring section which obtains TBS corresponding to the CQI value, by referring to the CQI mapping table, a BLER setting section which sets a BLER that is calculated from the ACK signal and NACK signal transmitted from the UE, and a TBS changing section which changes the acquired TBS based on the calculated BLER.

The TBS changing section can be formed to contain: a PDU number calculating section for calculating the MAC-d PDU counts contained in the TBS; a PDU count increasing/decreasing section which increases/decreases the MAC-d PDU count; and a TBS changing section which makes a TBS large/small in correspondence to the increase/decrease in the MAC-d PDU count.

The PDU count increasing/decreasing section may contain: a minimum reference value determining section for determining whether or not the BLER is below a predetermined minimum reference value; and a good-condition MAC-d PDU count increasing section for increasing the MAC-d PDU count when the BLER is determined to be below the predetermined minimum reference value. Further, the TBS changing section may contain: a MAC-d PDU count increase corresponding TBS increasing section which makes the TBS large in correspondence to an increase in the MAC-d PDU count increased by the good-condition MAC-d PDU count increasing section.

The good-condition MAC-d PDU count increasing section may contain: a higher TBS acquiring section for acquiring a higher TBS corresponding to a higher CQI value obtained by increasing the CQI value by one, or by two or more by referring to the CQI mapping table; a higher MAC-d PDU count setting section for setting the count of the higher MAC-d PDUs contained in the higher TBS as the higher MAC-d PDU count; and a higher-range-limited MAC-d PDU count increasing section for increasing the MAC-d PDU counts within a range that does not exceed the higher MAC-d PDU number.

The higher-range-limited MAC-d PDU count increasing section may contain: a higher difference calculating section for calculating a difference between the count of MAC-d PDUs contained in the TBS and the higher MAC-d PDU count; an increase repeating section for repeating the increase in the MAC-d PDU count by one, or by two or more; a MAC-d PDU count increase limiting section for setting the increment in the MAC-d PDU count as the difference, when an increment amount in the MAC-d PDU count exceeds the difference by repeating the increase in the MAC-d PDU counts one, or by two or more with the increase repeating section.

The PDU number increasing/decreasing section contains: a maximum reference value determining section for determining whether or not the BLER exceeds a predetermined maximum reference value; and a bad-condition MAC-d PDU number decreasing section for decreasing the MAC-d PDU count when the BLER is determined as exceeding the predetermined maximum reference value. Further, the TBS changing section can be formed to contain a MAC-d PDU number decrease corresponding TBS reducing section for reducing the TBS in correspondence to the decrease in the MAC-d PDU count decreased by the bad-condition MAC-d PDU number decreasing section.

The bad-condition MAC-d PDU number decreasing section may contain: a lower TBS acquiring section for acquiring a lower TBS corresponding to a lower CQI value obtained by decreasing the CQI value by one, or by two or more by referring to the CQI mapping table; a lower MAC-d PDU number setting section for setting the count of lower MAC-d PDUs contained in the lower TBS as the lower MAC-d PDU count; and a lower-range-limited MAC-d PDU count decreasing section for decreasing the MAC-d PDU count within a range that does not fall below the lower MAC-d PDU count.

The lower-range-limited MAC-d PDU count decreasing section may contain: a lower difference calculating section for calculating a difference between the count of MAC-d PDUs contained in the TBS and the lower MAC-d PDU count; a decrease repeating section for repeating the decrease in the MAC-d PDU count by one or by two or more; a MAC-d PDU count decrease limiting section for setting the decrease in the MAC-d PDU count as the difference, when the decrement amount in the MAC-d PDU count exceeds the difference by repeating the decrease in the MAC-d PDU count by one or by two or more in the decrease repeating section.

The BLER setting section can be formed to set the BLER by every predetermined time. Further, the TBS changing section may change the TBS after the BLER setting section sets a given BLER and before setting a next BLER.

While the present invention has been particularly shown and described with reference to the exemplary embodiments thereof, the present invention is not limited to these exemplary embodiments. It will be understood by those of ordinary skill in the art that various changes in form and details may be made therein without departing from the spirit and scope of the present invention as defined by the claims.

What is claimed is:

1. A method of determining a TBS (Transport Block Size) comprising:
   setting a CQI (Channel Quality Indicator) value which is transmitted from a UE (User Equipment) which communicates based on a packet transmission standard HSDPA (High Speed Downlink Packet Access);
   acquiring the TBS by referring to a CQI mapping table based on the set CQI value;
   setting a BLER (BLock Error Rate) before, simultaneously, or after said setting a CQI value, and before, simultaneously, or after said acquiring the TBS; and
   changing said TBS based on the BLER,
   wherein said changing comprises:
   calculating a MAC-d PDU (Medium Access Control-dedicated Protocol Data Unit) count indicating a number of MAC-d PDUs contained in said TBS;
   increasing/decreasing the MAC-d PDU count based on the BLER; and
   making the TBS large/small in correspondence to the increase/decrease of the MAC-d PDU count,
   wherein said increasing/decreasing comprises:
   determining whether or not the BLER is lower than a minimum reference value; and
   increasing the MAC-d PDU count when the BLER is determined to be lower than the minimum reference value,
   said making the TBS large/small comprises:
   making the TBS large in correspondence to the increase of the MAC-d PDU count,
   wherein said increasing the MAC-d PDU count comprises:
   acquiring an upper TBS by referring to said CQI mapping table based on an upper CQI value obtained by incrementing the set CQI value;
   setting an upper MAC-d PDU count for the upper TBS; and
   increasing the MAC-d PDU count in a range which does not exceed the upper MAC-d PDU count,
   wherein said increasing the MAC-d PDU count in a range comprises:
   calculating a difference between the upper MAC-d PDU count and the MAC-d PDU count;
   repeating increasing the MAC-d PDU count based on the BLER; and
   setting an increasing amount of the MAC-d PDU count as a new difference when the increasing amount exceeds the difference.

2. The method according to claim 1, wherein said setting the BLER is executed for every predetermined time,
   said changing said TBS is executed between said setting the BLER and said setting a next BLER.

3. A method of determining a TBS (Transport Block Size) comprising:
   setting a CQI (Channel Quality Indicator) value which is transmitted from a UE (User Equipment) which communicates based on a packet transmission standard HSDPA (High Speed Downlink Packet Access);
   acquiring the TBS by referring to a CQI mapping table based on the set CQI value;
   setting a BLER (BLock Error Rate) before, simultaneously, or after said setting a CQI value, and before, simultaneously, or after said acquiring the TBS; and
   changing said TBS based on the BLER,
   wherein said changing comprises:
   calculating a MAC-d PDU (Medium Access Control-dedicated Protocol Data Unit) count indicating a number of MAC-d PDUs contained in said TBS;
   increasing/decreasing the MAC-d PDU count based on the BLER; and
   making the TBS large/small in correspondence to the increase/decrease of the MAC-d PDU count, wherein said increasing/decreasing comprises:
determining whether the BLER exceeds a predetermined maximum reference value; and
decreasing the MAC-d PDU count when it is determined that the BLER exceeds the predetermined maximum reference value,
said making the TBS large/small comprises:
making the TBS small based on the decrease of the MAC-d PDU count,
wherein said decreasing comprises:
acquiring a lower TBS by referring to said CQI mapping table based on a lower CQI value obtained by decreasing the set CQI value;
setting a lower MAC-d PDU count; and
decreasing the MAC-d PDU count in a range which does not exceed the lower MAC-d PDU count,
wherein said decreasing comprises:
calculating a difference between the lower MAC-d PDU count and the MAC-d PDU count;
repeating the decrease of the MAC-d PDU count based on the BLER; and
setting a decreasing amount of the MAC-d PDU count as a new difference when the decreasing amount exceeds the difference.

4. A non-transitory recording medium in which a computer-readable software program code is stored to realize a TBS (Transport Block Size) determining method, which comprises:
setting a CQI (Channel Quality Indicator) value which is transmitted from a UE (User Equipment) which communicates based on a packet transmission standard HSDPA (High Speed Downlink Packet Access);
acquiring a TBS by referring to a CQI mapping table based on the set CQI value;
setting a BLER (BLock Error Rate) before, simultaneously, or after said setting a CQI value, and before, simultaneously, or after said acquiring the TBS; and
changing said TBS based on the BLER
wherein said changing comprises:
calculating a MAC-d PDU (Medium Access Control-dedicated Protocol Data Unit) count indicating a number of MAC-d PDUs contained in said TBS;
increasing/decreasing the MAC-d PDU count based on the BLER; and
making the TBS large/small in correspondence to the increase/decrease of the MAC-d PDU count,
wherein said increasing/decreasing comprises:
determining whether or not the BLER is lower than a minimum reference value; and
increasing the MAC-d PDU count when the BLER is determined to be lower than the minimum reference value,
said making the TBS large/small comprises:
making the TBS large in correspondence to the increase of the MAC-d PDU count,
wherein said increasing the MAC-d PDU count comprises:
acquiring an upper TBS by referring to said CQI mapping table based on an upper CQI value obtained by incrementing the set CQI value;
setting an upper MAC-d PDU count for the upper TBS; and
increasing the MAC-d PDU count in a range which does not exceed the upper MAC-d PDU count,
wherein said increasing the MAC-d PDU count in a range comprises:
calculating a difference between the upper MAC-d PDU count and the MAC-d PDU count;
repeating increasing the MAC-d PDU count based on the BLER; and
setting an increasing amount of the MAC-d PDU count as a new difference when the increasing amount exceeds the difference.

5. A non-transitory recording medium in which a computer-readable software program code is stored to realize a TBS (Transport Block Size) determining method, which comprises:
setting a CQI (Channel Quality Indicator) value which is transmitted from a UE (User Equipment) which communicates based on a packet transmission standard HSDPA (High Speed Downlink Packet Access);
acquiring the TBS by referring to a CQI mapping table based on the set CQI value;
setting a BLER (BLock Error Rate) before, simultaneously, or after said setting a CQI value, and before, simultaneously, or after said acquiring the TBS; and
changing said TBS based on the BLER,
wherein said changing comprises:
calculating a MAC-d PDU (Medium Access Control-dedicated Protocol Data Unit) count indicating a number of MAC-d PDUs contained in said TBS;
increasing/decreasing the MAC-d PDU count based on the BLER; and
making the TBS large/small in correspondence to the increase/decrease of the MAC-d PDU count,
wherein said increasing/decreasing comprises:
determining whether the BLER exceeds a predetermined maximum reference value; and
decreasing the MAC-d PDU count when it is determined that the BLER exceeds the predetermined maximum reference value,
said making the TBS large/small comprises:
making the TBS small based on the decrease of the MAC-d PDU count,
wherein said decreasing comprises:
acquiring a lower TBS by referring to said CQI mapping table based on a lower CQI value obtained by decreasing the set CQI value;
setting a lower MAC-d PDU count; and
decreasing the MAC-d PDU count in a range which does not exceed the lower MAC-d PDU count,
wherein said decreasing comprises:
calculating a difference between the lower MAC-d PDU count and the MAC-d PDU count;
repeating the decrease of the MAC-d PDU count based on the BLER; and
setting a decreasing amount of the MAC-d PDU count as a new difference when the decreasing amount exceeds the difference.

* * * * *